US009936556B2

(12) United States Patent
Chraibi et al.

(10) Patent No.: US 9,936,556 B2
(45) Date of Patent: Apr. 3, 2018

(54) APPARATUS FOR CONTROLLING LIGHTING PARAMETERS BASED ON TIME OF DAY AND/OR AMBIENT LIGHT CONDITIONS AND RELATED METHODS

(71) Applicant: PHILIPS LIGHTING HOLDING B.V., Eindhoven (NL)

(72) Inventors: Sanae Chraibi, Eindhoven (NL); Philip Steven Newton, Waalre (NL); Jonathan David Mason, Waalre (NL); Bertrand Rigot, Veldhoven (NL); Dzmitry Viktorovich Aliakseyeu, Eindhoven (NL); Ramon Antoine Wiro Clout, Eindhoven (NL); Bram Knaapen, Eindhoven (NL); Tim Dekker, Eindhoven (NL); Bartel Marinus Van de Sluis, Eindhoven (NL); Maria Hendrica Verbucken, Uden (NL)

(73) Assignee: PHILIPS LIGHTING HOLDING B.V., Eindhoven (NL)

(*) Notice: Subject to any disclaimer, the term of this patent is extended or adjusted under 35 U.S.C. 154(b) by 15 days.

(21) Appl. No.: 15/032,375

(22) PCT Filed: Oct. 17, 2014

(86) PCT No.: PCT/IB2014/065411
§ 371 (c)(1),
(2) Date: Apr. 27, 2016

(87) PCT Pub. No.: WO2015/063644
PCT Pub. Date: May 7, 2015

(65) Prior Publication Data
US 2016/0295658 A1    Oct. 6, 2016

Related U.S. Application Data

(60) Provisional application No. 61/896,264, filed on Oct. 28, 2013.

(51) Int. Cl.
*H05B 37/02* (2006.01)
*G05D 23/19* (2006.01)
(Continued)

(52) U.S. Cl.
CPC ....... *H05B 33/0854* (2013.01); *F21K 9/1355* (2013.01); *F21V 19/006* (2013.01);
(Continued)

(58) Field of Classification Search
CPC ............ H05B 33/0854; H05B 33/0809; H05B 33/0845; H05B 33/0872; H05B 7/0218;
(Continued)

(56) References Cited

U.S. PATENT DOCUMENTS 6,016,038 A    1/2000 Mueller et al.
6,211,626 B1   4/2001 Lys et al.
(Continued)

FOREIGN PATENT DOCUMENTS

CA    2709745 A1    1/2012
CN   202652636 U    1/2013
(Continued)

*Primary Examiner* — Tung X Le
*Assistant Examiner* — Raymond R Chai
(74) *Attorney, Agent, or Firm* — Meenakshy Chakravorty

(57) ABSTRACT

Disclosed is a lighting unit (10) that utilizes sensor data to select a fade-in or fade-out profile for one or more light sources (12). The lighting unit includes a clock module (20), an ambient light level sensor (18), and a controller (16). The controller receives ambient light level data from the ambient light level sensor and time of day data from the clock module, and utilizes the received information to automatically select a fade-in or fade-out profile. The controller can also use the received ambient light level data to calibrate the clock module.

2 Claims, 11 Drawing Sheets

(51) Int. Cl.
  *H05B 33/08* (2006.01)
  *F21K 99/00* (2016.01)
  *F21V 19/00* (2006.01)
  *F21Y 101/00* (2016.01)

(52) U.S. Cl.
  CPC ..... *H05B 33/0809* (2013.01); *H05B 33/0845* (2013.01); *H05B 33/0872* (2013.01); *H05B 37/0218* (2013.01); *H05B 37/0227* (2013.01); *H05B 37/0272* (2013.01); *H05B 37/0281* (2013.01); *F21Y 2101/00* (2013.01); *Y02B 20/46* (2013.01)

(58) Field of Classification Search
  CPC .. H05B 7/0227; H05B 7/0272; H05B 7/0281; F21K 9/1355; F21V 19/006
  See application file for complete search history.

(56) References Cited

U.S. PATENT DOCUMENTS

| | | | |
|---|---|---|---|
| 7,014,336 | B1 | 3/2006 | Ducharme et al. |
| 2010/0244735 | A1* | 9/2010 | Buelow, II ............. H05B 35/00 315/294 |
| 2010/0296285 | A1 | 11/2010 | Chemel et al. |
| 2011/0133649 | A1 | 6/2011 | Kreiner et al. |
| 2013/0140988 | A1 | 6/2013 | Maxik et al. |
| 2013/0169189 | A1* | 7/2013 | Bernard ............. H05B 37/0272 315/307 |
| 2017/0168511 | A9* | 6/2017 | Modi ..................... G05D 23/19 |

FOREIGN PATENT DOCUMENTS

| | | |
|---|---|---|
| KR | 20120105366 A | 9/2012 |
| KR | 20130011513 A | 1/2013 |
| WO | 2013067389 A1 | 5/2013 |

\* cited by examiner

APPARATUS FOR CONTROLLING LIGHTING PARAMETERS BASED ON TIME OF DAY AND/OR AMBIENT LIGHT CONDITIONS AND RELATED METHODS

CROSS-REFERENCE TO PRIOR APPLICATIONS

This application is the U.S. National Phase application under 35 U.S.C. § 371 of International Application No. PCT/IB2014/065411, filed Oct. 17, 2014, which claims the benefit of U.S. Provisional Patent Application No. 61/896,264, filed on Oct. 28, 2013. These applications are hereby incorporated by reference herein.

TECHNICAL FIELD

The present invention is directed generally to the control of light sources. More particularly, various inventive methods and apparatus disclosed herein relate to a lighting unit having adjustable output attributes based on time of day and/or ambient light conditions.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038; 6,211,626; and 7,014,336 incorporated herein by reference.

For certain lighting applications, including security and comfort, light output can be adjusted based on the time of day. For home security, as an example, this is done to make it appear as if someone is home. For comfort, controlling light activation according to the time of day is often implemented to permit lights to go on automatically at a predetermined time, such as the morning when one would wake up. Alternatively, light might be regulated based on the time of day for home automation. In other cases, timing is needed in a light source to permit the light to change according to the time of day. However, such conventional solutions for time-based control of artificial light, do not take into consideration the color temperature change of natural light, or the intensity changes. A human's internal body clock, however, is originally driven by such changes in the light attributes.

Further, instant changes in light intensity are generally not appealing to the human eye, while more gentle changes are more comfortable. Accordingly, it is desirable to have a light source that will gently fade-in the intensity of emitted light from a low or zero intensity to the chosen final intensity during darker times of day or in a dark space. It is similarly desirable to have a light source that will gently fade-out the intensity of emitted light from the initial, bright intensity to a low or zero intensity during darker times of day or in a dark space. It is also desirable to have a light source that ramps up or down quickly during brighter times of day or in a bright space, as less acclimation is required by the user's eye.

While lighting units or light sources exist that gently ramp up or down the intensity of light, these systems do not account for the time of day or year, or the geophysical location of the light source. Thus, there is a need in the art for a lighting unit or light source that can adjust the lighting profile based on the time of day or year, that can optionally consider the geophysical location of the light source, and that can calibrate an internal clock mechanism utilizing data from an ambient light level sensor.

SUMMARY

The present disclosure is generally directed to a lighting unit configured for tracking the time of day and/or as sensing ambient light conditions and adjusting the intensity and/or color temperature of its light source accordingly. For example, the lighting unit can slowly "fade-in" (i.e. increase over time) during times of anticipated darkness and/or times of detected darkness, and can slowly "fade-out" (i.e., decrease over time) during times of anticipated darkness based on the detected time and/or times of detected darkness based on the light sensor.

Generally, in one aspect, the invention relates to a lighting unit that includes at least one light source where at least one property of light emitted from the at least one light source over time, such as, for example, intensity, is adjustable; a clock module; and a controller operably connected between the light source and the clock module. The controller is configured to receive time-of-day data from the clock module, and is further configured to automatically select a fade-in or fade-out intensity profile for light emitted from the at least one light source based at least in part upon the time-of-day data.

In some embodiments, the lighting unit further includes an ambient light level sensor configured to sense ambient light level, and the controller is operably connected between the light source and both of the ambient light level sensor and the clock module and is configured to receive ambient light data from the ambient light level sensor and time data from the clock module, and to automatically select the fade-in or fade-out intensity profile for light emitted from the at least one light source based at least in part upon the ambient light data or the time of day data In some embodiments, the lighting unit further comprises a light source driver operably connected between the controller and the at least one light source, and the controller is configured to provide the selected fade-in or fade-out intensity profile to light source driver.

In some embodiments, the controller is configured to utilize the ambient light data to calibrate the clock module.

In some embodiments, the lighting unit further comprises a global positioning system device (GPS), and the controller is configured to automatically select a fade-in or fade-out intensity profile for light emitted from the at least one light source based at least in part upon the positional information received from the GPS.

In some embodiments, the lighting unit further comprises an electrical connector which is configured to be compatible with a socket for a conventional incandescent or halogen lighting fixture.

Generally, in another aspect, the invention relates to a method for determining a fade-in intensity profile using a lighting unit comprising at least one light source, an ambient light level sensor, a clock module, and a controller operably connected between the light source and both of the ambient light level sensor and the clock module, the method comprising the steps of receiving ambient light level data at the controller from the ambient light level sensor, receiving time data at the controller from the clock module, receiving a request for a fade-in intensity profile, determining, using the controller, the fade-in intensity profile based at least in part on the received ambient light data or the time data, and performing the determined fade-in intensity profile.

Generally, in yet another aspect, the invention relates a method for determining a fade-out intensity profile using a lighting unit comprising at least one light source, a clock module, and a controller operably connected between the light source and the clock module, the method comprising the steps of receiving time data at the controller from the clock module, receiving a request for a fade-out intensity profile, determining, using the controller, a fade-out intensity profile based at least in part on the time data, and performing the determined fade-out intensity profile.

Generally, in still another aspect, the invention relates to a method for calibrating a clock module using a lighting unit comprising at least one light source, an ambient light level sensor, the clock module, and a controller operably connected between the light source and both of the ambient light level sensor and the clock module, the method comprising the steps of receiving ambient light level data at the controller from the ambient light level sensor, receiving time data at the controller from the clock module, receiving a request to turn the at least one light source on, receiving a request to turn the at least one light source off, receiving ambient light level data at the controller from the ambient light level sensor, determining, using data from the clock module, how much time has elapsed between the request to turn the at least one light source on and the request to turn the at least one light source off, determining the approximate time of day based at least in part on how much time has elapsed and any change in ambient light level data from when the request to turn the at least one light source on was received and when the request to turn the at least one light source off was received, and adjusting the clock module based on the determined approximate time of day.

Generally, in still further aspect, the invention relates to a method for determining a lighting scene using a lighting system comprising at least one light source, wherein a property of light emitted from the at least one light source is adjustable, a clock module, a memory, and a controller operably connected to the at least one light source, the clock module and the memory. The method includes the steps of storing in the memory executable instructions for each of a plurality of lighting scenes, receiving a request for a lighting scene, receiving time data at the controller from the clock module, selecting, using the controller, executable instructions for one of the plurality of lighting scenes based at least in part on the time data, and performing the selected executable instructions.

In some embodiments, the adjustable property of emitted light is the intensity of light from the light source, and/or the color of light emitted from the at least one light source. In some embodiments, the lighting system further includes a user interface configured to allow a user to modify the executable instructions for one or more of the plurality of lighting scenes.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

The term "lighting scene" as used herein refers to a specific configuration of light sources to achieve a desirable lighting or illumination of a room, surface, space, or other target. The configuration can include, for example, a property of radiation that is perceivable by an observer (although this usage is not intended to limit the scope of this term). For example, properties affected by the configuration can include intensity and color, among many other properties.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Applicants have recognized and appreciated that it would be beneficial to provide a lighting unit that can adjust certain attributes of its output, for example, intensity and/or color temperature, based upon the time of day and ambient light conditions.

In view of the foregoing, various embodiments and implementations of the present invention are directed to a lighting unit, such as, for example, a stand-alone LED-based light bulb that includes components for tracking the time of day as well as sensing ambient light conditions and adjusting the intensity and/or color temperature of its light source accordingly.

Figure 1:
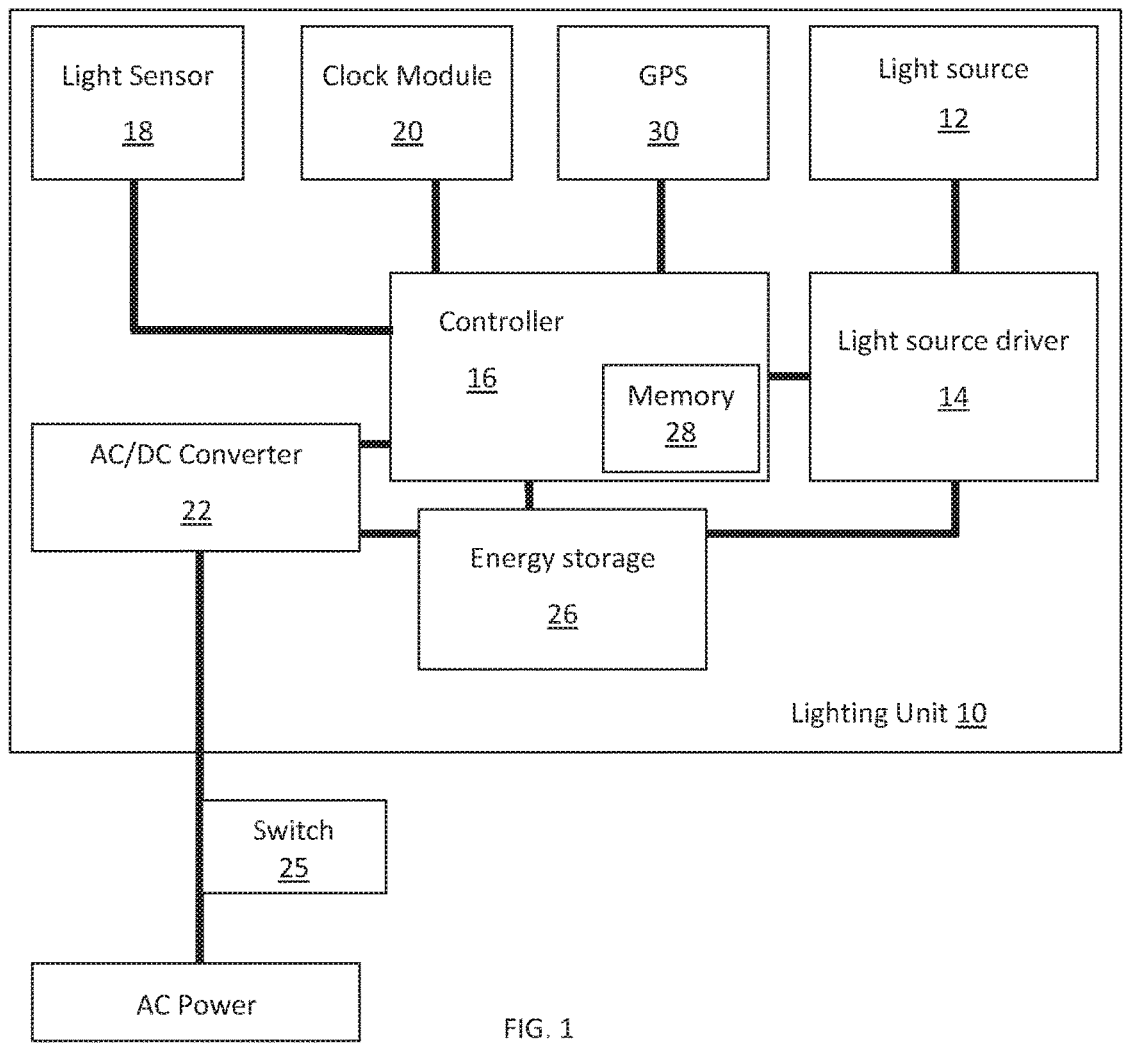
FIG. 1 illustrates a block diagram of a lighting unit in accordance with an embodiment of the invention.

Referring to FIG. 1, in one embodiment, a lighting unit 10 is provided that includes one or more light sources 12, such as, for example, an LED-based light source employing one or more LEDs. The light source can be driven to emit light of predetermined character (i.e, color intensity, color temperature) by one or more light source drivers 14. Many different configurations and various types of light sources (all LED-based light sources, LED-based and non-LED-based light sources alone or in combination, etc.) adapted to generate radiation of a variety of different colors may be employed in the lighting unit 10.

Lighting unit 10 may also include a controller 16 that is configured or programmed to output one or more signals to drive the light sources and generate varying intensities and/or colors of light from the light sources. For example, controller 16 may be programmed or configured to generate a control signal for each light source to independently control the intensity and/or color of light generated by each light source, to control groups of light sources, or to control all light sources together. According to another aspect, the controller 16 may control other dedicated circuitry such as light source driver 14 which in turn controls the light sources so as to vary their intensities. Controller 16 can be, for example, a microprocessor programmed using software to perform various functions discussed herein, and can be utilized in combination with a memory 28. The memory can store data, including one or more lighting commands or software programs for execution by the microprocessor, as well as various types of data including but not limited to specific identifiers for that lighting unit.

Controller 16 can be programmed, structured and/or configured to cause light source driver 14 to adjust the intensity and/or color temperature of light source 12 based on predetermined data, such as ambient light conditions and/or the time of day, among others, as will be explained in greater detail hereinafter.

In addition, lighting unit 10 can include a light sensor 18, such as a photodiode, that is connected to an input of controller 16 and collects ambient light data in the vicinity of lighting unit 10 and can transmit data to controller 16 that is representative of the ambient light data it collects. In some embodiments, sensor 18 is remote from the lighting unit 10 and transmits obtained sensor data to a communications module 40 of the lighting unit. The communications module 40 can be, for example, Bluetooth, IR, or near field communication that is positioned in communication with controller 16 or, alternatively, controller 16 can be integrated with the communications module.

Further, lighting unit 10 includes a clock module 20 that is either integrated into controller 16 or connected to controller 16 such that it can receive signals from controller 16 as well as provide signals to controller 16.

Lighting unit 100 also includes a source of power 24, most typically AC power, although other power sources are possible including DC power sources, solar-based power sources, or mechanical-based power sources, among others. The power source may be in operable communication with a power source converter that converts power received from an external power source to a form that is usable by the lighting unit. In order to provide power to the various components of lighting unit 10, it can also includes an AC/DC converter (e.g., rectifying circuit) 22 that receives AC power from an external AC power source 24 and converts it into direct current for purposes of powering the light unit's components. Additionally, lighting unit 10 can include an energy storage device 26, such as a rechargeable battery or capacitor, that is recharged via a connection to AC/DC converter 22 and can provide power to controller 16 and light source driver 14 when the circuit to AC power source 24 is opened (i.e., when the light switch 25 is turned off). Thus, energy storage device 26 permits continuous power to be supplied to controller 16 for purposes of maintaining the function of the clock module 20, and can also provide power after AC power has been shut-off to light source driver 14 for purposes of permitting light source 12 to fade off or, if desired, maintain a minimal amount of light emittance even when AC power is switched off.

According to an embodiment, lighting unit 10 requires time data provided by clock module 20, light data provided by light sensor 18, and geographic position information with regard to the location of light source 12, in order to determine an appropriate lighting profile for the lighting unit, and/or to calibrate clock module 20. Accordingly, controller 16 can be programmed, structured, and/or configured to manipulate, store, or access geographic position information with regard to the location of light source 12. For example, a GPS 30 can be provided as part of lighting unit 10 for purposes of receiving geographic position data. Alternatively, controller 16 can be programmed, structured, and/or configured at the point of manufacture (or by a user at the point of installation) with the geographic location data where lighting unit 10 is or will be located. With the geographic position data known, controller 16 can store in its memory 28 sunrise and sunset data for that geographic location. Coupled with ambient light data collected by light sensor 18 and time of day and/or day of year data provided by clock module 20, controller 16 can be programmed with light-correcting algorithms that will determine the appropriate level of light to correspond with the natural light of the geographic location on the given day of the year and at the given time. Through use of this light-correcting algorithm, controller 16 can then supply a signal to light source driver 14 that will adjust and/or regulate the light intensity and/or color so that the light source 12 emits light corresponding to the natural light levels one would expect at the time of day.

For example, the controller 16 can direct light source 12 to slowly "fade-in" (i.e. increase over time) during times of anticipated darkness based on the detected time and/or times of detected darkness based on the light sensor. As another example, the controller 16 can direct light source 12 to slowly fade-out (i.e., decrease over time) during times of anticipated darkness based on the detected time and/or times of detected darkness based on the light sensor. Controller 16 can also direct light source 12 to quickly fade-in during times of anticipated daylight based on the detected time and/or times of detected daylight based on the light sensor. Controller 16 can also direct light source 12 to quickly fade-out during times of anticipated daylight based on the detected time and/or times of detected daylight based on the light sensor.

Figure 2:
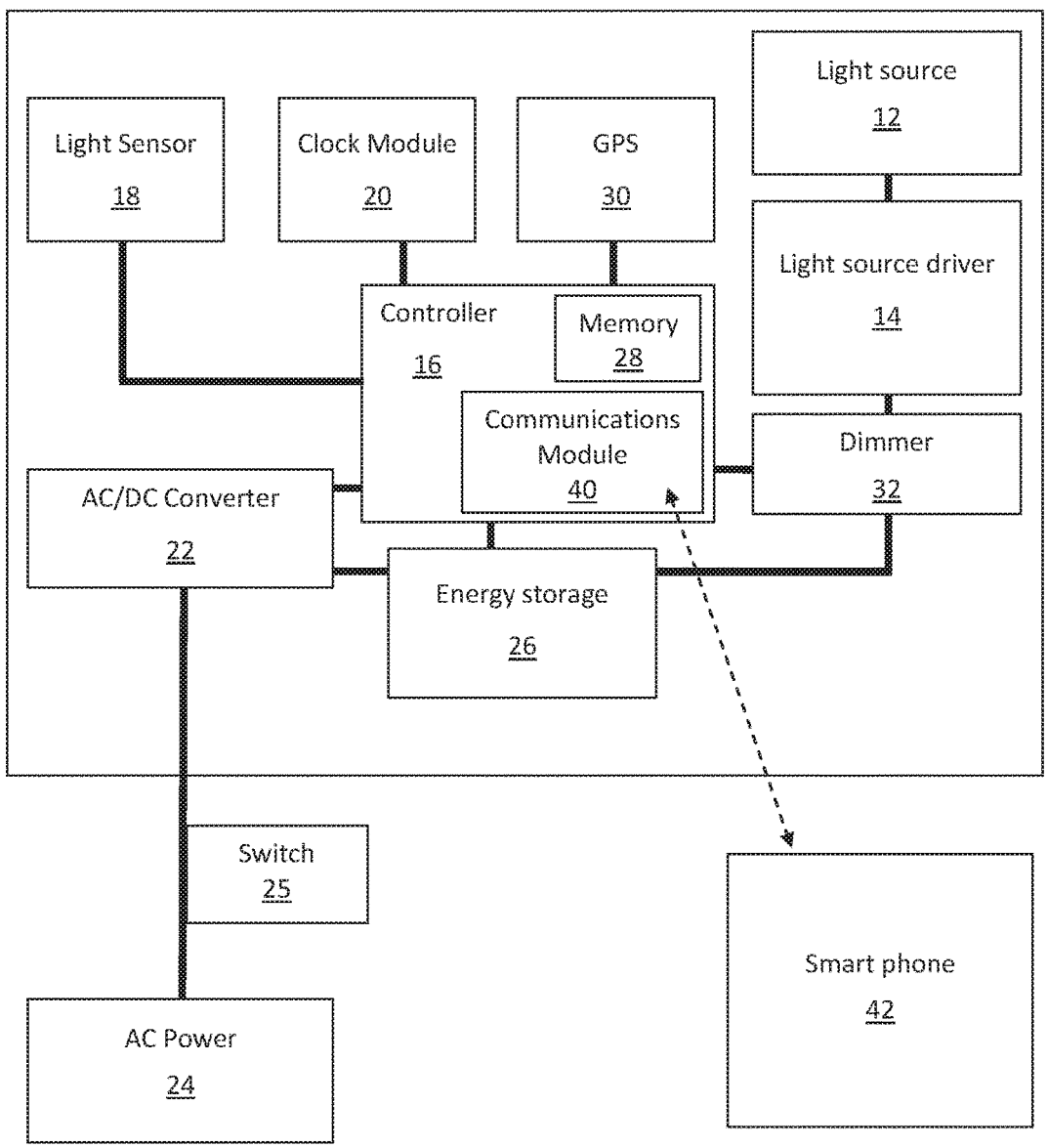
FIG. 2 illustrates a block diagram of a lighting unit in accordance with another embodiment of the invention.

Referring to FIG. 2, in one embodiment, a lighting unit 10 is provided that includes one or more light sources 12. In this embodiment, dimmer 32 is positioned between the controller 16 and light source driver 14. Dimmer 32 can be a slide or knob positioned on the exterior of lighting unit 10 that is accessible to a user and permits the user to selectively alter a parameter of lighting unit 10, such as its light intensity or color temperature, between minimum and maximum levels. For instance, dimmer 32 can permit the minimal brightness level (which can vary within the range defined by dimmer 32) light source 12 will emit.

Another embodiment of lighting unit 10, also shown in FIG. 2, provides a communications module 40 such as Bluetooth, IR, or near field communication (NFC) chip that is positioned in communication with controller 16 or, alternatively, controller 16 can be integrated with a NFC chip. A smart phone 42 or other wireless transmitting computing device equipped with a software application that contains time and date data, as well as, optionally, geographic position data, can be positioned in close proximity to lighting unit 10 and activated to transfer the time/date/position to the communications module 40 which, in turn, communicates this data to controller 16 which in turn calibrates clock module 20 with the time data and store the data and position data for use in processing its lighting algorithms, as further described herein.

Figure 3:
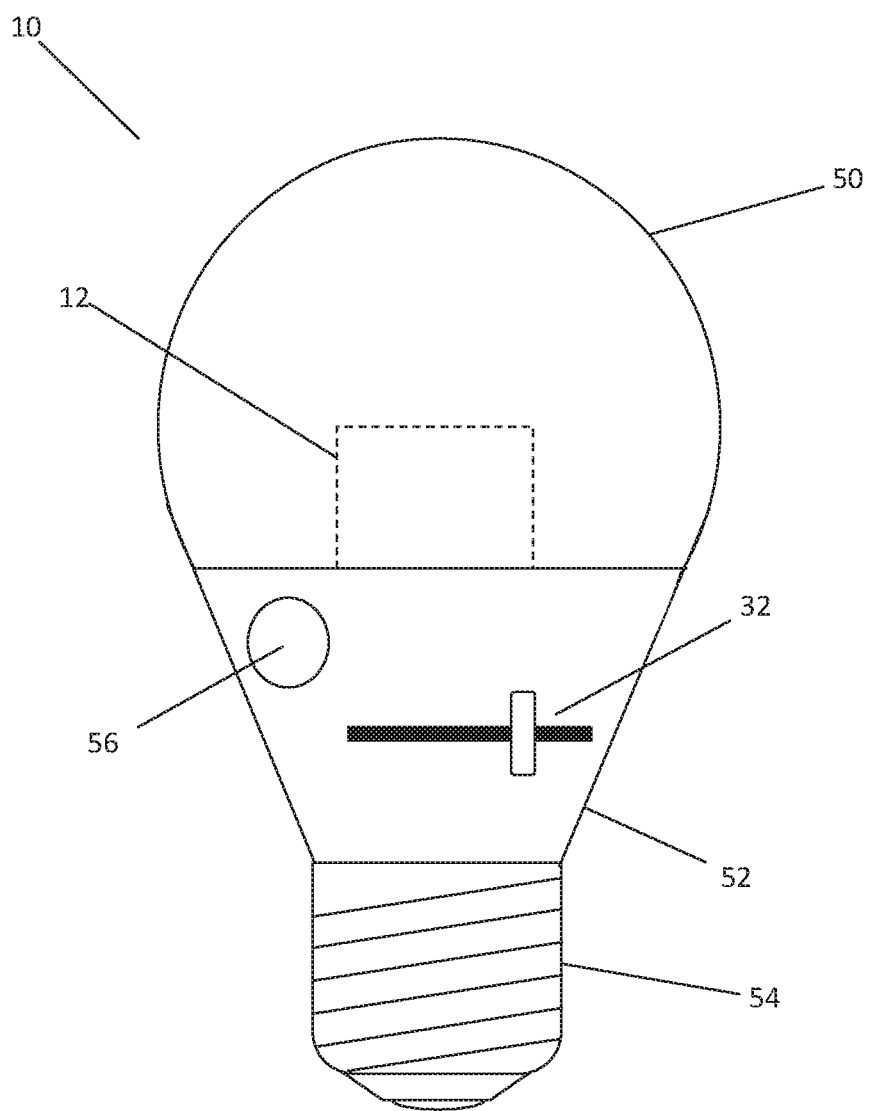
FIG. 3 illustrates a lighting unit in accordance with another embodiment of the invention.

Referring to FIG. 3, a lighting unit 10 in accordance with an embodiment of the invention is disclosed. In some embodiments, a LED-based lighting unit 10 is configured for retrofitting into a lighting fixture normally employing a conventional light source, such as, for example, am incandescent, a compact fluorescent, or halogen light bulb, etc. The term "retrofit" means fitting into a lighting fixture normally used for conventional light sources. Accordingly, an conventional light source can be replaced or retrofitted with a LED-based lighting unit 10.

As illustrated in FIG. 3, a retrofit LED-based lighting unit 10 includes an envelope 50, which can be, for example, composed of glass, plastic, or any other completely or semi-transparent or -translucent material. Inside the envelope 50 is an LED-based light source 12. The LED-based light source 12 may have one or more LEDs, and can be driven to emit light of predetermined character (i.e, color intensity, color temperature) by one or more light source drivers 14. Many different numbers and various types of light sources (all LED-based light sources, LED-based and non-LED-based light sources alone or in combination, etc.) adapted to generate radiation of a variety of different colors may be employed in the lighting unit 10.

The LED-based lighting unit 10 can further include a base 52, which in turn can include an electrical connector 54, preferably threaded, which is arranged such that it is capable of mating with a socket (not shown), preferably threaded, of a lighting fixture. For example, the electrical connector 54 is compatible with the Edison-type socket (not shown) for a traditional incandescent lamp. Base 52 can include one or more of a light source driver 14, a controller 16, a memory 28, a clock module 20, an energy storage device 26, a GPS 30, and/or a communications module 40, as described in various embodiments. Base 52 can include, for example, any of the components of the lighting units described in conjunction with FIGS. 1, 2, and 10.

Base 52 may also include a light sensor, such as a photodiode, 18 that is connected to an input of controller 16 and collects ambient light data in the vicinity of lighting unit 10 and can transmit data to controller 16 that is representative of the ambient light data it collects. As illustrated in FIG. 3, in some embodiments the base 52 of the LED-based lighting unit 10 includes a sensor opening 56 through which ambient light can be received by light sensor 18. In some embodiments, light sensor 18 extends partially or completely through the sensor opening 56. In other embodiments, sensor 18 is remote from the lighting unit 10 and transmits obtained sensor data to a communications module 40 of the lighting unit.

In some embodiments, the retrofit LED-based lighting unit 10 can include a dimmer 32 such as a slide or knob, which is accessible to a user and permits the user to selectively alter a parameter of the lighting unit, such as its light intensity or color temperature, between minimum and maximum levels. For instance, dimmer 32 can permit the minimal brightness level (which can vary within the range defined by dimmer 32) light source 12 will emit.

Figure 4:
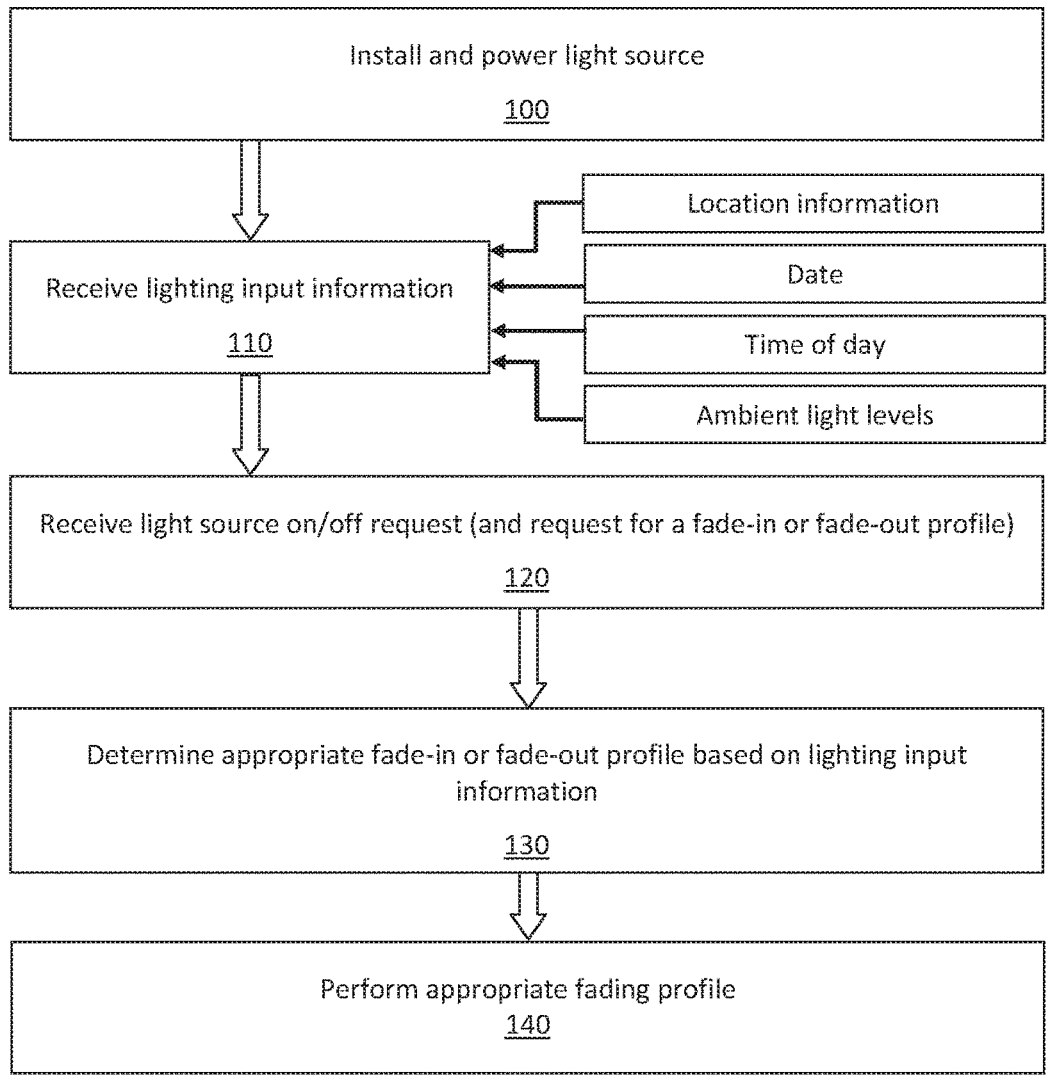
FIG. 4 is a flow chart of a method for determining a lighting profile in accordance with an embodiment of the invention.

Referring to FIG. 4, a flow chart illustrating a method for determining a lighting profile in accordance with an embodiment of the invention is disclosed. In step 100, a lighting unit 10 is installed and connected to a source of AC power 24. The lighting unit can be any of the embodiments described herein or otherwise envisioned, and can include any of the components of the lighting units described in conjunction with FIGS. 1 and 2 (e.g., light source 12, light source driver 14, controller 16, sensor 18, clock module 20, etc.).

In step 110, lighting unit 10 receives lighting input data from various internal and/or external data output components. For example, lighting input data can include ambient light level data from light sensor 18, time of day or data from clock module 20 and location data from a GPS 30. Alternatively, the smart phone or portable computing device can transmit the time, date, and/or location data to communications module 40.

In step 120, lighting unit 10 receives an on/off request via a user locally or remotely actuating a switch 25. For example, if lighting unit 10 is installed in a lighting fixture located within a wall or ceiling of a room, the user can enter the room and flip a connected switch on the wall. If lighting unit 10 is installed in a portable lighting fixture such as a lamp, the switch will be located close to lighting unit 10. Alternatively, the lighting unit 10 can receive the on/off request in response to an automated system or device such as a security device, timer, or a sound- or light-activated device.

In step 130, controller 16 determines the appropriate lighting profile based on the lighting input data received in step 110 and the time at which the on/off request was sent. For example, if the user turns ON light source 12 at 3:00 AM, the ambient light data will most likely reveal that there is very little ambient light, if any, and a lighting profile that will slowly fade-in the intensity of light source 12 will be utilized. Accordingly, controller 16 can use the time data and/or the ambient light level data to choose an appropriate lighting profile from among a number of different profiles. For example, there may be stored in memory a lighting profile for every time of day, or for approximate times of day. However, a lighting profile which is normally appropriate for 3:00 AM may not be appropriate if there is another bright light source in the room.

Figure 7:
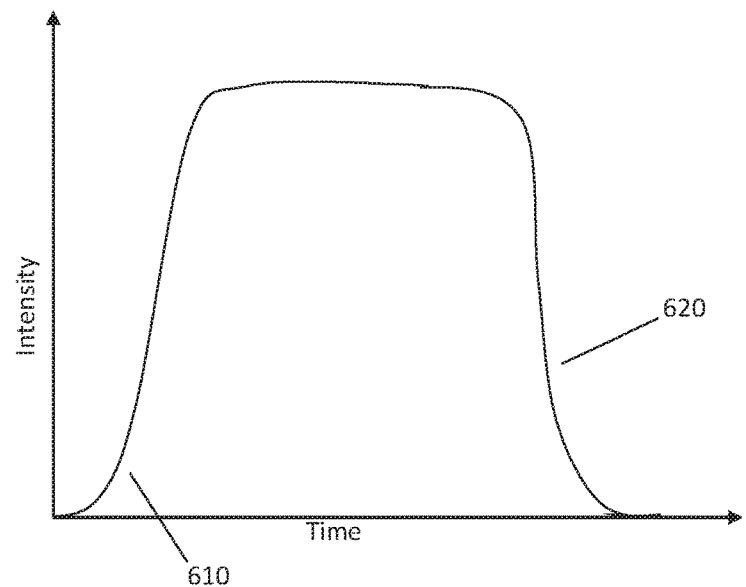
FIG. 7 illustrates a lighting profile in accordance with an embodiment of the invention.
Figure 8:
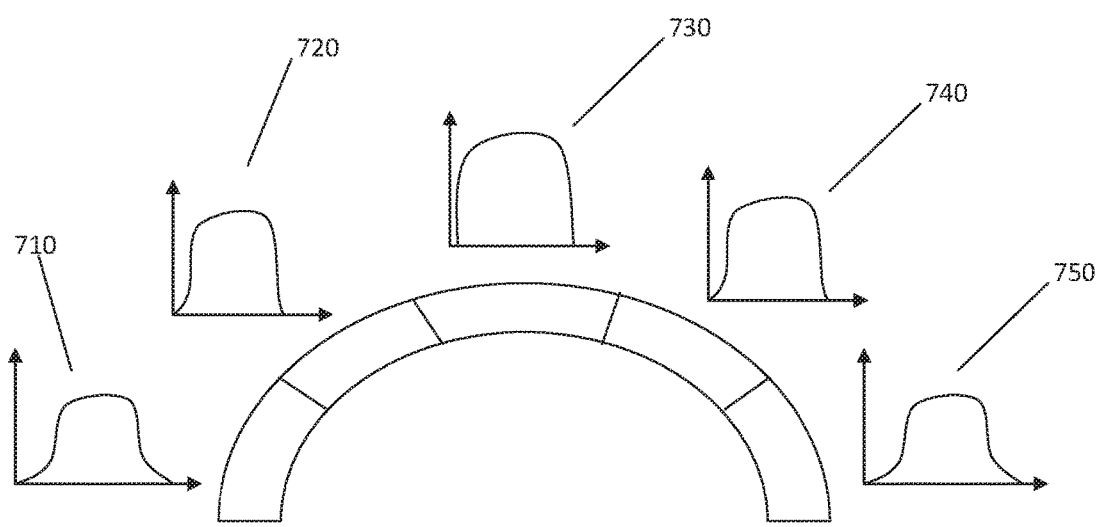
FIG. 8 illustrates the selection of a lighting profile based at least in part on the time of day in accordance with an embodiment of the invention.

For example, illustrated in FIGS. 7 and 8 are various lighting profiles, including lighting profiles that are determined at least in part based on the time of day. In FIG. 7, the lighting profile exhibits a gradual fade-in of intensity when light source 12 is turned ON at section 610 of the curve. The lighting profile exhibits a gradual fade-out of intensity when light source 12 is turned OFF at section 610 of the curve. The light source is both turned ON and turned OFF at times of darkness, or in ambient light levels indicating darkness.

In FIG. 8, the five different lighting profiles are dependent at least in part on the time of day, which can serve as a proxy for the intensity of ambient light over the course of the day as depicted in ambient light level curve 760. Alternatively, ambient light over the course of the day can serve as a proxy for the time of day (and thus can serve as a calibration for time of day, as described in greater detail below). In the morning and evening, ambient light levels are low so the intensity of light emitted from light source 12 is changed gradually as shown in graphs 710 and 750 which depicted of the intensity of the light over time. In mid-morning and late afternoon, the ambient light levels are higher so the intensity of light emitted from light source 12 is changed more quickly as shown in graphs 720 and 740. In mid-afternoon, the ambient light levels are at their highest so the intensity of light emitted from light source 12 is changed most quickly as shown in graph 730.

According to one embodiment, controller 16 first checks the time data to set a default lighting profile that will be activated, but then immediately checks the ambient light level data to determine if the default lighting profile should be modified. For example, the default 3:00 AM lighting profile could be modified if the ambient light level sensor detects a bright light source in the room.

According to another embodiment, controller 16 first checks the ambient light level data to set a default lighting profile that will be activated, but then immediately checks the time data to determine if the default lighting profile should be modified. For example, the default "dark room" lighting profile chosen in response to low ambient light level data from the light sensor may be modified if the user has modified the programming to use an alternative lighting profile on certain days of the week.

As another example, if the user turns ON light source 12 at 5:00 PM, the ambient light data will most likely reveal that there is a lot of ambient light, and a lighting profile that quickly or instantly ramps up the intensity of light source 12 will be utilized.

Similarly, if the user turns OFF light source 12 at 3:00 AM, controller 12 will mostly likely utilize the time of day data from clock module 20 to choose a lighting profile in which the intensity of light source 12 is slowly ramped down to give the eyes a chance to adjust and to prevent immediate darkness.

Although specific times are provided as examples, it should be recognized that many other times and lighting profiles are possible.

In step 140, controller 16 can send a signal to light source driver 14 that will cause light source driver 14 to perform the lighting profile determined in step 130 by regulating a parameter or parameters of light source 12, such as the color temperature or color intensity of light source 12.

Figure 5:
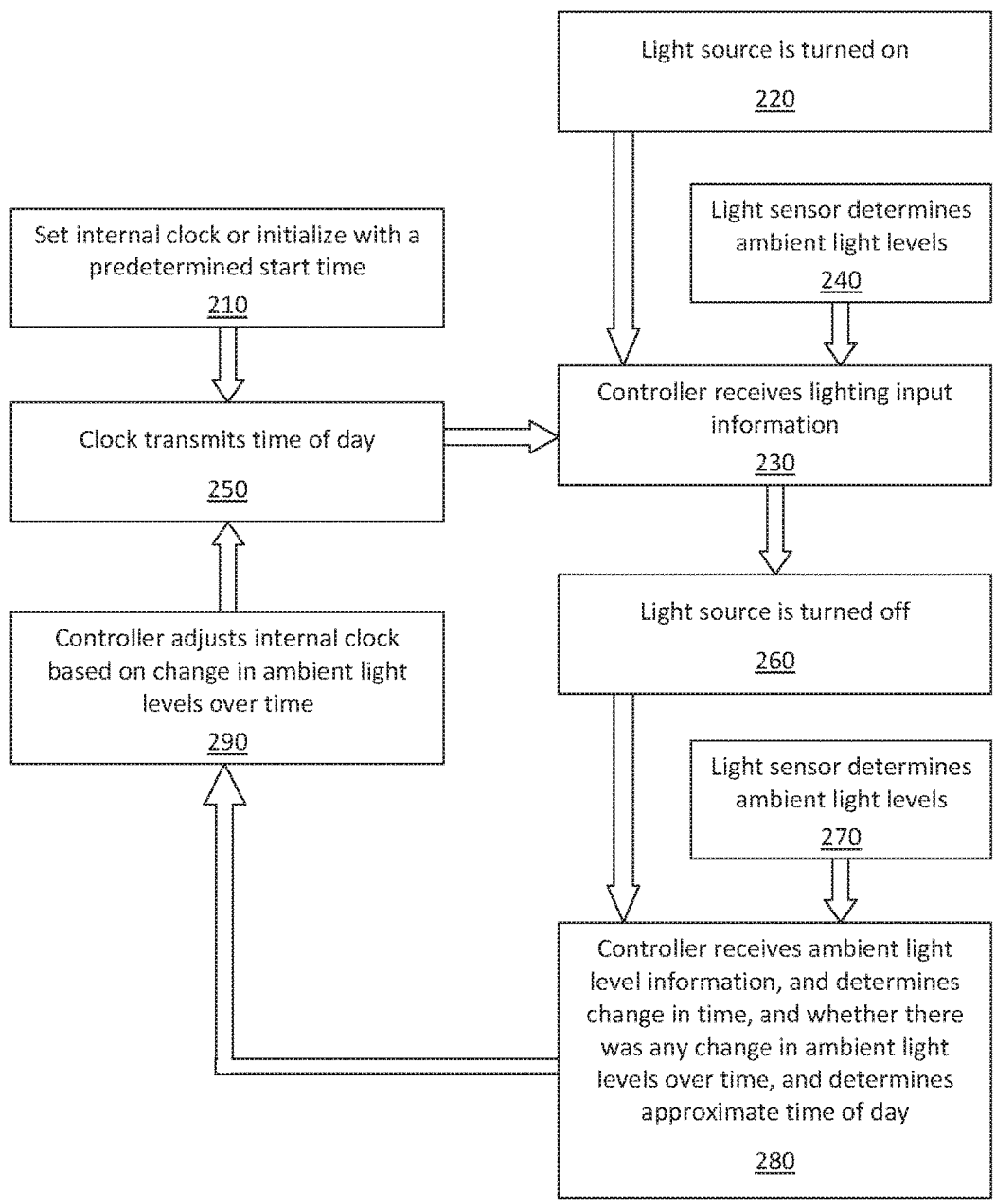
FIG. 5 is a flow chart of a method of calibrating a clock in accordance with an embodiment of the invention.

Referring to FIG. 5, a flow chart illustrating a method for calibrating a lighting unit clock module 20 in accordance with an embodiment of the invention is disclosed. A lighting unit 10 according to any of the embodiments described herein or otherwise envisioned, and including any of the components of the lighting unit (e.g., light source 12, light source driver 14, controller 16, sensor 18, clock module 20, etc.) can be utilized in this method, as well as other lighting units.

In step 210, the clock module 20 of lighting unit 10 is set with a particular time, such as a particular date and/or time of day. For example, the clock module can be programmed or initialized at a point of manufacture or assembly with the actual date and/or time of day, or a predetermined start time (e.g., Unix time 0). According to one embodiment, the clock module is set with the approximate date and time when it is assembled into lighting unit 10 at a factory. Alternatively, a predetermined or preprogrammed date and/or time of day can be activated when the lighting unit is introduced to a power source by the user (e.g., when lighting unit 10 is installed and switch 25 is turned to its on position).

In step 220, the lighting unit 10 receives a request to turn light source 12 ON, with the request coming from a user locally or remotely actuating a switch 25. Alternatively, the lighting unit 10 can receive the on/off request in response to an automated system or device such as a security device, timer, or a sound- or light-activated device.

In step 230, lighting unit 10 receives lighting input data from various internal and/or external data output components. For example, lighting input data can include ambient light level data from light sensor 18, time of day data and date data from clock module 20 and, in certain embodiments, location data from a GPS 30. In step 250, for example, clock module 20 sends data about day, year, and/or time to lighting unit 10. Any of this or the other lighting input data can be sent to lighting unit 10 continuously or intermittently, or can be actively retrieved by lighting unit 10 when there is a demand or need for that data in order to perform a function or in response to a request from the microprocessor.

According to an embodiment, lighting unit 10 receives ambient light level data from sensor 18 which was collected while light source 12 was in an OFF state in step 240. For example, lighting unit 10 may utilize the most recent ambient light level data available, or may retrieve recent ambient light level data from the associated memory. This information can be stored in memory 28 to be used in later calibration steps.

In step 260, light source 12 is turned OFF and, in step 270, ambient light level data is again collected by light sensor 18 and the data is sent to controller 16 of lighting unit 10. Lighting unit 10 also collects or has collected or retrieves from memory the length of time that has expired since the light source 12 was turned ON (e.g., the time that elapsed between controller 16 receiving the two ambient light data points from light sensor 18) as well as the geographic location of the lighting unit 10, if known.

In step 290, controller 16 determines the approximate or possible time of day based on at least the collected and/or retrieved ambient light level data and the amount of elapsed time. The controller utilizes that information to calibrate the clock module 20 with the proper time.

For example, if light source 12 is turned ON at 6:00 AM, the ambient light data would likely reveal that it was dark (dependent at least in part on the time of year). If light source 12 was then turned off at 7:30 AM the same day, the ambient light data would show a marked increase in ambient light over time. Based on these two ambient light data points, including the intensity of the ambient light levels and the amount of change over time, and the knowledge from clock module 20 that 1.5 hours elapsed between the ambient light data collection, controller 16 can determine the actual time within an acceptable level of error.

According to one embodiment, memory 28 includes a database containing ambient light level data at various times of day, and controller 16 is programmed to compare the collected ambient light data with the database and perform a calculation to determine the approximate time of day.

Figure 6:
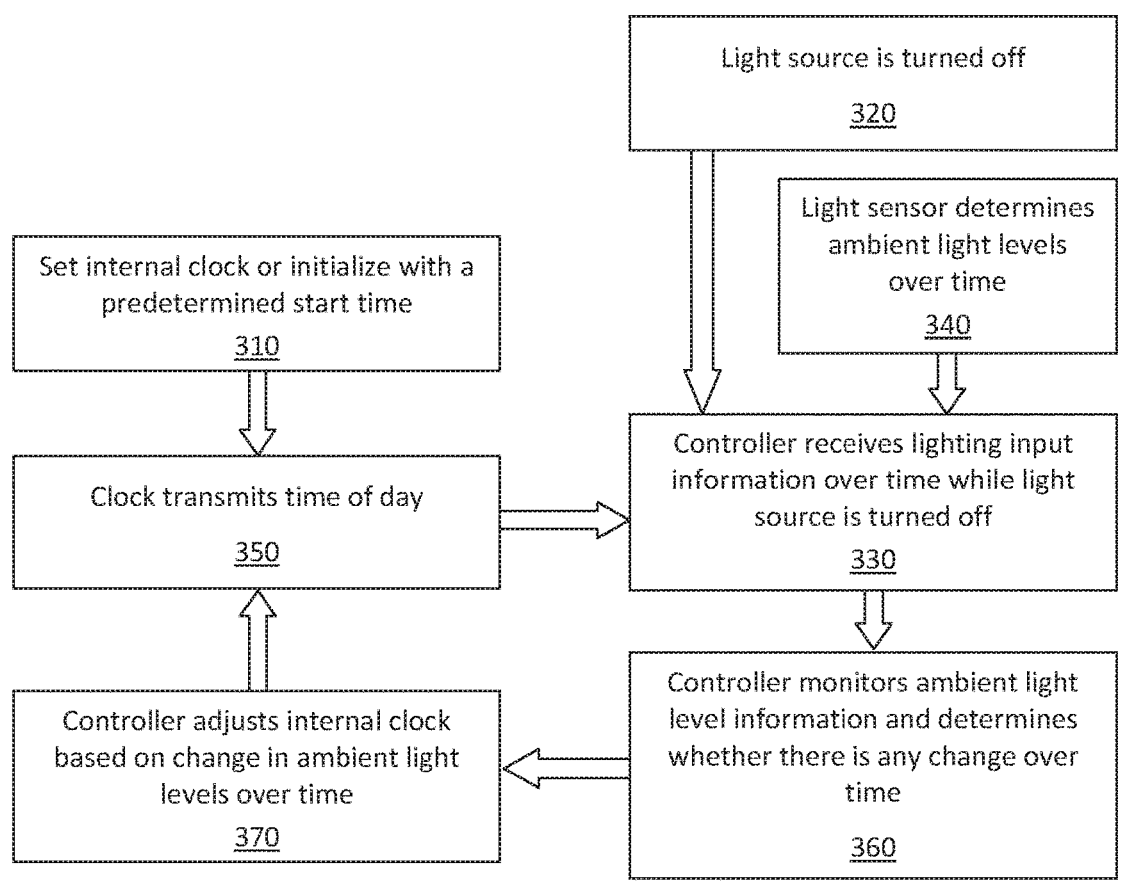
FIG. 6 is a flow chart of a method of calibrating a clock in accordance with another embodiment of the invention.

Referring to FIG. 6, a flow chart illustrating a method for calibrating a lighting unit clock module 20 in accordance with an embodiment of the invention is disclosed. Initially, in step 310, clock module 20 is set at the point of manufacture or is initialized with a predetermined start time (e.g., Unix time 0) when lighting unit 10 is first provided power (e.g., when lighting unit 10 is installed and switch 25 is turned to its on position). Once light source 12 is turned off, in step 320, controller 16 will continuously receive ambient light data over time from light sensor 18 in steps 330 and 340. As ambient light data is collected over time, controller 16 monitors the changes in ambient light level data over time (the elapsed time data being provided by clock module 20 in step 350) in step 360. Based on the changes to the ambient light levels over time, controller 16 calculates the time and will then adjust clock module 20 based on the changes in ambient light data over time in step 370. This updated time data sent to clock module 20 is then used by clock module 20 in step 350 to transmit again to controller 16 each successive time light source 12 is turned to its off position from its on position and the process can repeat itself.

As an example, if light source 12 was turned off at 7:30 AM, the ambient light data would reveal that it was somewhat bright. If light source 12 was then turned on at 4:30 PM the ambient light data just prior to light source 12 being turned on would show a marked increase in the ambient light data as compared to the light data from 7:30 AM. Based on these two ambient light data points and knowing that 9.0 hours elapsed between the ambient light data collection, controller 16 can determine within an acceptable level of error, the actual time. For instance, a database containing ambient light level data at various times of day can be stored in memory 28 and controller 16 can be programmed, configured and/or structured to compare the collected ambient light data with the database and then performing a calculation to determine the time of day.

In some embodiments, the fade-in, fade-out, and/or other lighting profile of a light source or a lighting unit can be preprogrammed to occur automatically based on the time of day, ambient light, room population, or other input. The fade-in, fade-out, and/or other lighting profile of a lighting unit can be programmed to achieve a desirable lighting or illumination of a room, surface, space, or other target, referred to as a lighting scene. The lighting scene can be achieved by programming one or more properties of the radiation emitted from one or more lighting units. A lighting scene can be utilized to enhance the ambience of a space, and to satisfy the preferences or requirements of a user.

Figure 9:
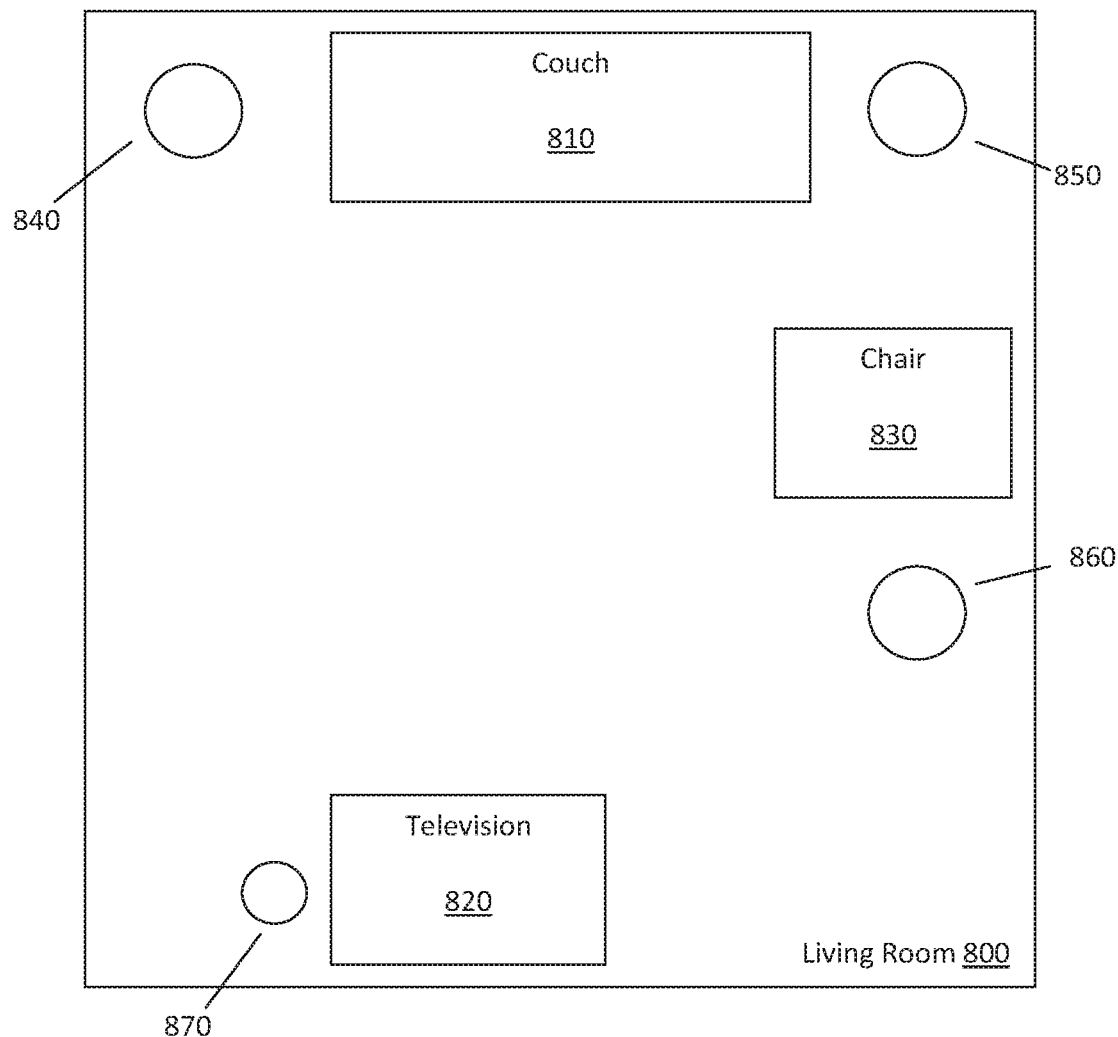
FIG. 9 illustrates a room with a variety of connected lighting units in accordance with an embodiment of the invention.

Accordingly, in a space such as a living room 800 shown in FIG. 9 with a couch 810, television 820, and chair 830, lighting units 840, 850, 860, and 870 are connected via any type of connection and/or network such as wired or wireless. Each of lighting units 840, 850, 860, and 870 can individually render a lighting scene, or the lighting units can be selectively grouped into smaller sub-groups to render a lighting scene.

Figure 10:
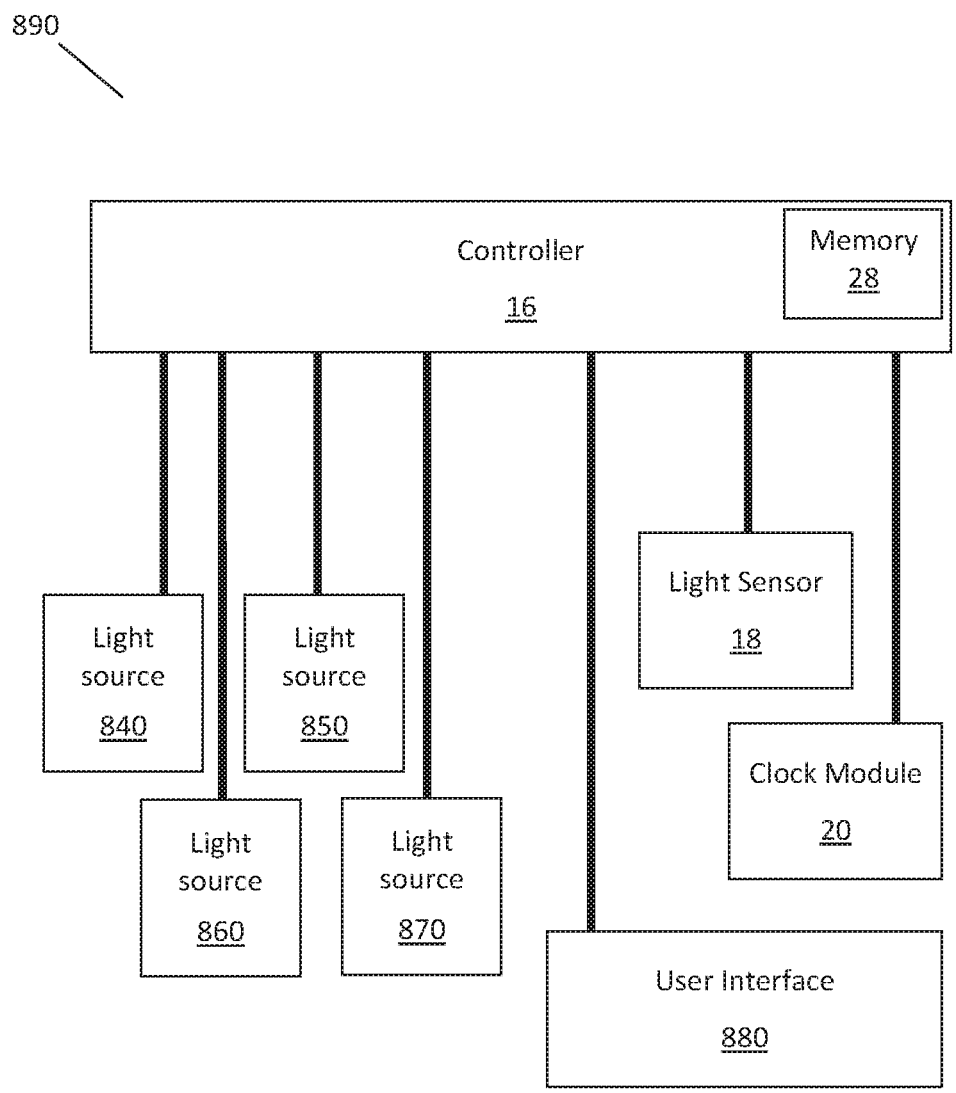
FIG. 10 illustrates a lighting system in accordance with an embodiment of the invention.

FIG. 10 shows a lighting system 890 according to an embodiment. The lighting system includes a controller 16 coupled to and configured to control light sources 840, 850, 860, and 870. The controller 16 may also be coupled to or include a memory 28 which can be configured to store pre-sets, lighting scenes, and other computer readable and executable instructions for execution by the controller to control the light sources. The controller is further configured to control the light sources 840, 850, 860, and 870 individually or in groups to change one or more lighting properties such as, for example, intensity and/or color, to render a lighting scene. The light sources 840, 850, 860, and 870 may be grouped to define a lighting scene which may be stored for selection and control by a user. The relationship between or among the light sources may also be stored as part of a pre-set stored lighting scene.

Lighting system 890 may also include a light sensor 18 utilized to detect ambient light levels, or to self-monitor and/or auto-correct a rendered lighting scene. The lighting system may also include a clock module 20 to monitor the time and/or date.

A user interface 880 can be utilized to program a lighting scene, or to program the clock module 20. The user interface 880 may further include scene buttons or controls that allow the user to adjust total light output, color, dimming control, or a variety of other light source properties. The indications near each button or control may be a pictogram, icon, or text to show the activity that is selected.

Figure 11:
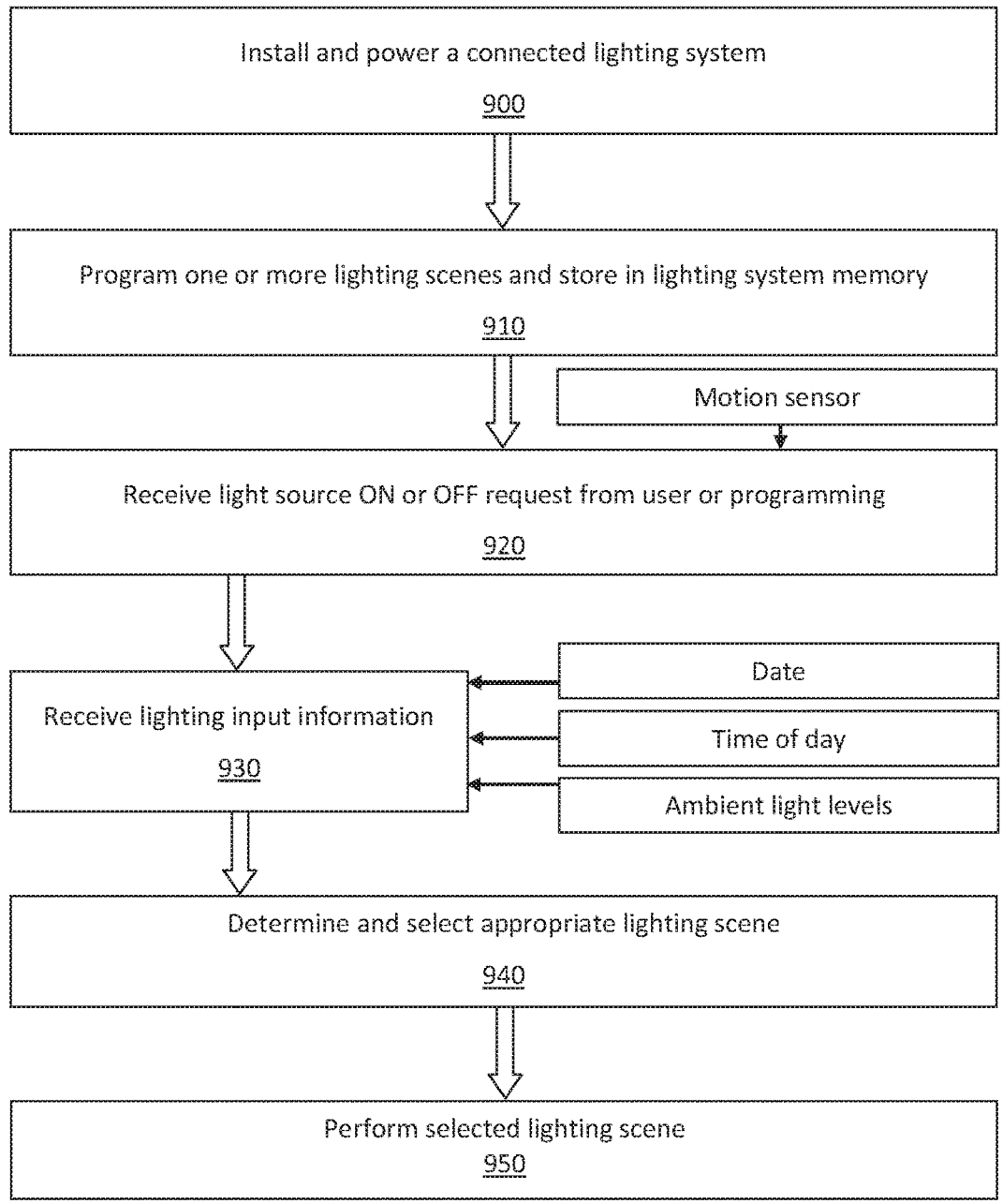
FIG. 11 is a flow chart of a method for determining a lighting scene in accordance with an embodiment of the invention.

Referring to FIG. 11, a flow chart illustrating a method for rendering a pre-programmed lighting scene via connected lighting in accordance with an embodiment of the invention is disclosed. In step 900, a lighting system 890 is installed and powered. The lighting system 890 includes one or more lighting units 10 and/or light sources 12. Lighting unit 10, for example, includes one or more light sources 12, where one or more of the light sources may be an LED-based light source. Further, the LED-based light source may have one or more LEDs. The light source can be driven to emit light of predetermined character (i.e, color intensity, color temperature) by one or more light source drivers 14. Many different numbers and various types of light sources (all LED-based light sources, LED-based and non-LED-based light sources alone or in combination, etc.) adapted to generate radiation of a variety of different colors may be employed in the lighting unit 10. The lighting unit can be any of the embodiments described herein or otherwise envisioned, and can include any of the components of the lighting units described in conjunction with FIGS. 1, 2, and 10 (e.g., light source 12, light source driver 14, controller 16, sensor 18, clock module 20, etc.).

In step 910, the lighting system 890 is programmed to render a specific lighting scene. The programming can be accomplished, for example, via user interface 880 or automatically by the controller 16. For example, the user may desire to have a bright and warm lighting scene in the morning when getting ready for work. That lighting scene may build gradually using a fade-in profile, as described above. The user may desire to have an even brighter lighting scene during the day, or a dimmer lighting scene in the evening with an optional fade-out profile.

Although controller 16 and user interface 880 are shown as physically integrated or coupled within lighting system 890, one or both components may be implemented in the form of a remote control unit within the lighting system 890. In some embodiments, parts of the controller 16 or some of the functions performed by controller 16 are embodied within a remote control unit. User interface 880 may be, for example, software implemented in a remote control unit such as a PDA (Personal Digital Assistant), which usually includes a processor and a memory for storing programs. Thus, a standard PDA or smart phone of a user may be configured to be used as a user interface. Communication with controller 16 or another component with lighting system 890 may be accomplished for example by means of a wireless communication interface of the PDA or smart phone, such as a WLAN (Wireless Local Area Network), Bluetooth, or infrared interface.

In some embodiments, the lighting scene programming of lighting system 890 is accomplished automatically using a learning algorithm executed by controller 16. For example, after a certain period of use the learning algorithm can determine that the user always sets the intensity of light sources in room A at a certain level during the day, and at another level in the evening. The learning algorithm can then program the light sources in room A to turn on or fade-in to the level normally set by the user at that time of day. As another example, the learning algorithm can determine that the user always sets the intensity of light sources in room A at a first level, and in room B at a second, different level, or at a second, different color.

In some embodiments, the lighting scene programming of lighting system 890 is accomplished from a remote location using a portal, smart phone program, or other remote access mechanism. For example, the user of lighting system 890 may be visiting a location with a particular input such as a color or intensity that can be measured or determined via a sensor and can then be transferred to lighting system 890 using the portal, smart phone program, or other remote access mechanism. This portability allows the user to set, modify, and/or manipulate the programming of lighting system 890 from one or more remote location. As an example, the user may be at a location remote from the installation site of the lighting system 890, and can capture or measure with a smart phone software application a color in the environment that the user wishes to replicate within the lighting system. Once captured or measured, the information about the color can be transferred via a wired or wireless connection to the lighting system to be utilized in a new or existing scene. In some embodiments, preprogrammed lighting scenes can be exchanged or purchased from other users.

In step 920, the lighting system 890 receives an ON or OFF request from a user locally or remotely actuating a light switch, in response to an alarm, or at a preprogrammed time of day, among other options. For example, if a lighting unit 10 is installed in a lighting fixture located within a wall or ceiling of a room, the user can enter the room and flip a connected switch on the wall. If a lighting unit 10 is installed in a portable lighting fixture such as a lamp, the switch will be located close to lighting unit 10. Alternatively, the lighting unit 10 can receive the on/off request in response to an automated system or device such as a security device, timer, or a sound- or light-activated device. For example, the lighting system 890 can be programmed to activate a preselected scene at 5:15 PM just before the user is scheduled to come home. As another example, the user's smart phone can transmit a signal to the lighting system once the user or phone has reached a programmed geofenced region, such as in close proximity to home where the lighting system is installed.

In optional step 930, lighting system 890 receives lighting input data from various internal and/or external data output components. For example, lighting input data can include ambient light level data from light sensor 18, time of day data and date data from clock module 20, location data from a GPS 30, a remote smart phone, or the Internet, among many other inputs. Alternatively, a smart phone or portable computing device can transmit the time, date, and/or location data to a communications module 40 within lighting system 890. Controller 16 of lighting system 890 can utilize this lighting input data to chose and/or modify a preprogrammed lighting scene. For example, if a light ON or OFF request is received at 11:30 am based on input from the clock module 20, the controller can determine which of a plurality of stored lighting scenes to activate, which can include, for example, a fade-in or fade-out profile. As another example, if the light ON or OFF request is received when the ambient light level is very high based on input from the light sensor, the controller can determine which of a plurality of stored lighting scenes to activate, which can include, for example, a fade-in or fade-out profile. As another example, if the light ON or OFF request is received when the weather forecast or current weather conditions are cloudy based on input from a weather sensor, ambient light sensor, or a daily forecast, the controller can determine which of a plurality of stored lighting scenes to activate, which can include, for example, a fade-in or fade-out profile.

In step 940, controller 16 determines the appropriate lighting scene based on a variety of inputs. For example, the input can include the lighting input data received in step 930, such as the ambient light levels, the time of day or year, and other inputs. As an example, controller 16 can use the input data to choose an appropriate lighting scene from among a number of different lighting scenes. For example, there may be stored in memory a lighting scene for every time of day, or for approximate times of day. However, a lighting profile which is normally appropriate for 3:00 AM may not be appropriate if there is another bright light source in the room. Accordingly, preprogrammed lighting scenes can be modified or adapted based on additional inputs.

Figure 12:
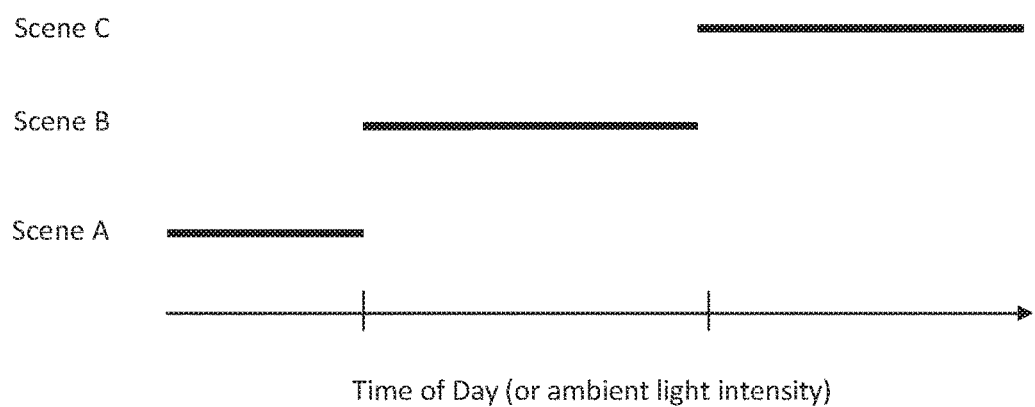
FIG. 12 illustrates a variety of preprogrammed lighting scenes in accordance with an embodiment of the invention.

For example, illustrated in FIG. 12 are various preprogrammed lighting scenes, including lighting scenes that are determined at least in part based on the time of day and/or the intensity of ambient light. As an example, early in the day the lighting system 890 selects Scene A as the preferred lighting scene. During mid-day, the lighting system 890 selects Scene B as the preferred lighting scene. And in the evening, the lighting system 890 selects Scene C as the preferred lighting scene. As another example, at low ambient light levels, the lighting system 890 selects Scene A as the preferred lighting scene. At moderate ambient light levels, the lighting system 890 selects Scene B as the preferred lighting scene. And at very high ambient light levels, the lighting system 890 selects Scene C as the preferred lighting scene. As yet another example, lighting scenes can be determined at least in part based on the number of people in a room, which can be detected automatically using a sensor or can be an input into a user interface. At low population levels, the lighting system 890 selects Scene A as the preferred lighting scene. At moderate population levels, the lighting system 890 selects Scene B as the preferred lighting scene. And at high population levels, the lighting system 890 selects Scene C as the preferred lighting scene. In some embodiments, any of the selected lighting scenes can be altered based on other input such as ambient light levels, weather conditions, the user's mood, the population of the room, and other input.

In some embodiments, the input can include information about the particular user. Different users in a space may preprogram different lighting scenes, and therefore it is desirable to have an identification module component of lighting system 890. For example, the lighting system can be programmed or configured to recognize the user's face, body proportions, or a signal emitted from the user's smart phone.

In step 950, the lighting system 890 can activate the selected lighting scene by sending a signal to a light source driver 14 that will cause light source driver 14 to perform the lighting scene determined in step 130 by regulating a parameter or parameters of light source 12, such as the color temperature or color intensity of light source 12. The selected lighting scene may include, for example, the selection of a particular group or sub-group of lighting units within a space.

In some embodiments, the programmed lighting scene is a "stumble" lighting scene designed to enable low intensity lighting of a space during the night. The low-intensity lighting prevents the user from stumbling in darkness while simultaneously avoiding the loss of night vision or suppressing melatonin production. For example, lighting system 890 can be activated by a motion sensor when the individual gets out of bed during normal sleeping hours. Based on the time, the lighting scene can be selected that provides a minimal amount of light. Additionally, in a lighting system 890 which includes multiple motion sensors and lighting units in multiple rooms, the lighting scene includes multi-room activation of lighting units as the user moves from room to room, or from a proximity to first lighting unit to a proximity to a second lighting unit. Alternatively, the multi-room activation of lighting units can be dependent entirely upon pre-programmed or learned amounts of time that it takes the user to move from room to room, or from a proximity to first lighting unit to a proximity to a second lighting unit. As an example, the lighting unit in the user's bedroom can be activated when the user gets out of bed during the night. The selected or pre-programmed lighting scene includes dim light, in a red color or tone to prevent the loss of night vision. As the user walks from the bedroom to the hallway, the lighting units in the hallway activate with a similar lighting scene. Finally, as the user walks into the bathroom, the lighting units in the bathroom activate with a similar lighting scene. Alternatively, all lighting units in the bedroom, hallway, and bathroom can activate with the selected lighting scene when sufficient motion is detected in the bedroom at night.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more"

of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

Also, reference numerals appearing in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for calibrating a clock module using a lighting unit comprising at least one LED-based light source, an ambient light level sensor, the clock module, and a controller operably connected between said light source and both of the said ambient light level sensor and the clock module, the method comprising the steps of:
    receiving ambient light level data at said controller from said ambient light level sensor;
    receiving time data at said controller from said clock module;
    receiving a request to turn the at least one light source on;
    receiving a request to turn the at least one light source off;
    receiving ambient light level data at said controller from said ambient light level sensor;
    determining, using data from said clock module, how much time has elapsed between the request to turn the at least one light source on and the request to turn the at least one light source off;
    determine the approximate time of day based at least in part on how much time has elapsed and any change in ambient light level data from when the request to turn the at least one light source on was received and when the request to turn the at least one light source off was received; and
    adjusting the clock module based on the determined approximate time of day.

2. The method of claim 1, further comprising the step of initializing the clock module with initial time data.

* * * * *